United States Patent [19]
Hartmann

[11] 3,783,261
[45] Jan. 1, 1974

[54] PARALLAX COMPENSATION CAMERA LIGHT

[75] Inventor: Rudolf Hartmann, Skokie, Ill.

[73] Assignee: Bell & Howell Company, Chicago, Ill.

[22] Filed: Nov. 1, 1972

[21] Appl. No.: 302,682

[52] U.S. Cl. ............... 240/1.3, 95/11 L, 240/44.1, 352/139, 352/140, 352/198
[51] Int. Cl. ............................................ G03b 15/02
[58] Field of Search ..................... 240/1.3, 2 C, 20, 240/44.1, 44.2; 95/1 R, 11 R, 11 L; 352/139, 140, 198

[56] References Cited
UNITED STATES PATENTS
3,369,467  2/1968  Land ................................. 95/11 L
2,585,653  2/1952  Heehler ......................... 240/44.1 X
3,280,320  10/1966  Beaton et al. ........................ 240/1.3
3,296,947  1/1967  Engelsmann et al. ................. 95/1 R
3,584,559  6/1971  Levin ............................. 352/140 X Primary Examiner—Fred L. Braun
Attorney—William K. Serp et al.

[57] ABSTRACT

A light for a camera having an objective lens coupled to an automatic focusing apparatus. A link assembly connects the focusing apparatus to a pivotally supported camera light reflector. The position of the reflector is varied in accordance with the setting of the focusing apparatus so as to direct the light beam at the subject over a wide range of subject to camera distances.

7 Claims, 2 Drawing Figures

PATENTED JAN 1 1974
3,783,261
Fig.1.
Fig.2.
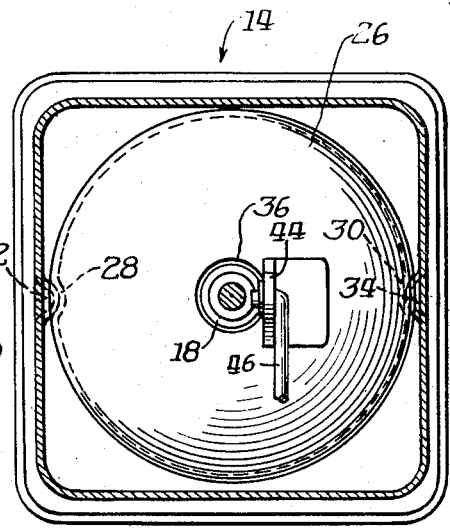
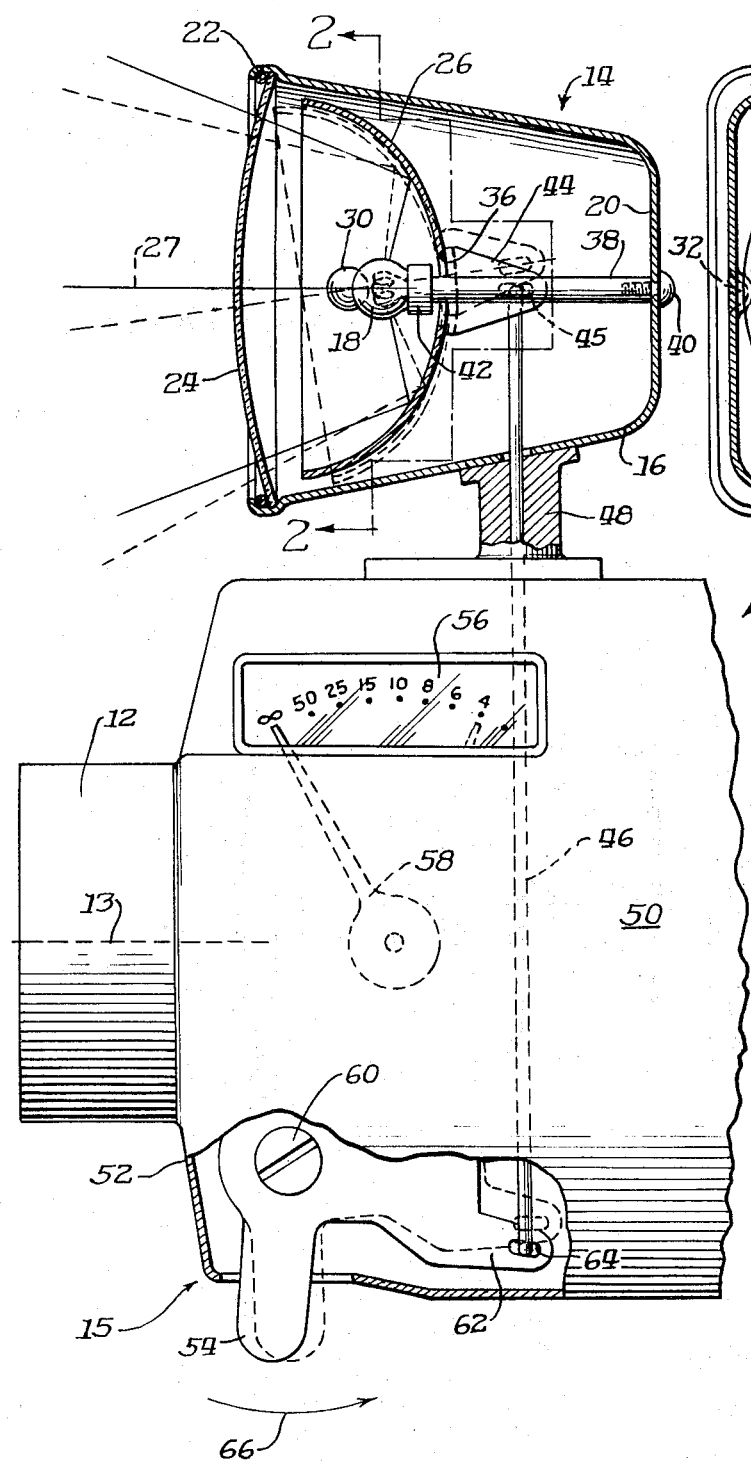

PARALLAX COMPENSATION CAMERA LIGHT

BACKGROUND OF THE INVENTION

This invention generally relates to a light for a camera and more particularly relates to a light for a camera including an objective lens having an adjustable focus wherein the light is automatically directed at the subject over a wide range of subject to camera distances.

Presently available motion picture cameras such as super 8mm cameras usually include means for automatically focusing the lens. One such focusing arrangement is described in U. S. Pat. application Ser. No. 147,943, filed May 28, 1971, now U.S. Pat. No. 3,715,161, by Henry J. Koeber entitled, "Lens Focusing Mechanism With Manual Control" and having a common assignee with this application. The device described in this reference utilizes the triangulation method of len focusing. The length of the vertical side of the triangle is empirically determined as the height of an average adult above the supporting plane on which the user stands. The user aligns the base of a remote subject with a reference mark in the viewfinder thus angling the camera by a determined amount. When the optical axis of the camera's lens is tilted with respect to the horizontal at the given angle to both the vertical side and the base side of the triangle, the required values necessary to compute the unknown length of the base line are available. As described in this reference, the user sights at the base of the subject and depresses a focusing lever conveniently located upon the camera. The lens then automatically focuses at the desired distance and the lever is released to lock the focus setting.

Present movie lights generally include a lamp mounted in relation to a parabolic reflector, the lamp being mounted by suitable means on top of the camera. The primary axis of the reflector is generally fixed in relation to the axis of the lens. To provide the greatest amount of light at distance subjects, the axis of the reflector is set during manufacture to intersect the lens axis at the maximum subject distance at which the light will provide sufficient illumination. For general use, this setting provides an acceptable compromise; however, at shorter filming distances, the light is directed beyond rather than at the subject. It will be appreciated that this arrangement, being a compromise, results in inefficient use of the movie light.

In an effort to eliminate this parallex condition, the housing of certain movie lights is swiveled with respect to the camera so that the user may manually direct the light toward the subject being photographed. Thus, the housing position is adjusted for each filming so that the primary axis of the light beam will intersect the subject. A particular inconvenience with such an arrangement is that the user must adjust the light housing for each selected lens focus setting. Frequently, due to pressures of time, the user may forget to correct the adjustment resulting in a light concentration which is considerably less than optimum.

A main object of this invention is to provide a light having an adjustable axis of illumination the position of which automatically corresponds to the prevailing subject to camera distance.

Other objects and advantages of this invention will become apparent from the following description and drawings, in which:

DESCRIPTION OF THE DRAWINGS

FIG. 1 is a plan view of a preferred embodiment of a light and cooperating camera including certain features of this invention with the camera fragmentarily and the light sectionally illustrated.

FIG. 2 is a sectional view of the light along the line 2—2 of FIG. 1.

DESCRIPTION OF THE ILLUSTRATED EMBODIMENT

Although the illustrated embodiment is hereinafter described with respect to a motion picture camera it will be appreciated that the features of this invention may be utilized with other optical devices.

Briefly, as illustrated in FIG. 1, the embodiment comprises a motion picture camera 10 having an objective lens 12 defining a lens axis 13 and means 15 for adjusting the focus setting of the lens so as to permit focusing at various subject to camera distances. Mounted to the top of the camera 10 is a movie light 14 including means for varying the primary axis of the light beam so that it may be directed at the selected subject over a wide range of subject to camera distances. As will be subsequently described, means are included for varying the direction of the light beam as determined by the focus setting of the lens 12.

The movie light 14 includes a light housing 16 which defines an open cavity wherein a light source in the form of a bulb 18 is supported. The housing includes a rear wall 20 and the periphery of the opening of the housing is formed to define a continuous channel 22 for receiving a protective transparent cover 24. Within the cavity of the light housing 16 and mounted for rotational movement with respect thereto is a parabolically shaped reflector 26 having a primary axis 27. The reflector 26 is formed of thin gauge polished metal. As particularly illustrated in FIG. 2 the periphery of the reflector is stamped to define opposing bosses 28 and 30 which receive dimples 32 and 34 formed in the inner wall of the light housing 16. During assembly, the metalic reflector 26, due to its resilient characteristic, is snapped into the housing so that the bosses 28 and 30 are in registration with the dimples 32 and 34 thereby permitting rotational movement of the reflector 26 with respect to the housing 16. The axis of rotation of the reflector 26 is through its diameter and normal to a plane passing through the axis 13 of the camera lens 12 and the center of the reflector 26. The reflector 26 defines a circular opening 36 through which passes a lamp support rod 38 one end of which is secured to the rear wall 20 of the housing 16 by means of a suitable fastener such as screw 40. To the remaining end of the lamp support rod 38 is secured a lamp socket 42 for receiving the lamp 18. Thus, the lamp 18 is fixed in relation to the light housing 16 wherein the parabolic reflector 26 is rotatably mounted. By rotating the reflector 26 about its rotational axis, the point of intersection of the primary axis 27 of the reflector and the lens axis 13 can be varied to correspond with the distance to the subject from the camera 10 as will hereinafter be further described.

Secured to the reflector 26 adjacent the circular opening 36 is a reflector positioning lug 44 which defines an elongated slot 45 for receiving a reflector drive shaft 46. The reflector drive shaft 46 passes through a light support pedestal 48 and into the camera 10. The camera 10 includes a housing 50 and projecting from a front wall 52 of the housing is the lens 12. Enclosed within the housing 50 is a focusing mechanism (not shown) for adjusting the focus of the lens to correspond with the subject to camera distance. A suitable focusing mechanism is described in the aforecited U. S. Pat. application Ser. No. 147,943.

The focus setting of the lens is set in response to a manual operation. A manually engagable release member 54 is depressed while the camera 10 is angled at the base of the subject. In this condition the focusing mechanism automatically sets the camera focus to the desired setting and the member 54 is released locking the lens 12 at the desired focus setting. As the member 54 is released it moves in a counter-clockwise direction toward its initial position; however, the return movement is limited so that the release member 54 returns to a position with respect to the camera which corresponds to the focus setting of the lens 12. In this position, both the lens 12 and the release member 54 are locked in position. As illustrated in FIG. 1, the release member 54 is shown in its fully released, clockwise position which corresponds to an infinite focus setting of the lens 12. In response to a relatively close focus, the release member 54 will lock in a counter-clockwise direction attaining the position illustrated by the phantom lines in FIG. 1. The focusing distance is indicated on the face of a suitably scaled meter 56 across which rides an indicating pointer 58. The release member 54 is pivotally supported to the camera body 50 by means of a pivot screw 60 and includes an extension arm 62. The end of the extension arm 62 defines slot 64 serving to receive the reflector drive shaft 46.

For purposes of discussion it will be assumed that the camea 10 is initially in the position illustrated in FIG. 1 with the lens focused at infinity and the axis 27 of the reflector 46 substantially parallel to the axis 13 of the objective lens 12. The user then sights the objective lens at the base of the subject to be photographed and depresses the operating lever 54 in a completely counter-clockwise direction as indicated by an arrow 66. The pointer 58 will arrive at, for example, the phantom position indicating a four foot distance from the camera to the subject. The user then releases the operating lever 54. The operating lever 54 will then move in a counter-clockwise direction; however, it will lock at the phantom position illustrated and the pointer 58 will similarly lock indicating the position at which the focusing mechanism of the camera is set. The user then directs the camera 10 at the subject upon which the setting has been made and proceeds with the filming operation. It will be noted that the arm 62 and the operating lever 54 are now in the position illustrated in phantom forcing the reflector positioning lug 44 upwardly to its phantom position. In this manner, the reflector 26 is turned on its rotational axis to the phantom position thereby directing the light beam downwardly toward the subject being photographed. As described, the position of the reflector 26 is adjusted to correspond with the focus setting of the lens 12 so that the primary axis 27 of the reflector 26 will intersect the axis 13 of the objective lens 12 substantially at the subject.

While this invention has been particularly shown and described with the preferred embodiment, it will be understood that various changes in form and detail may be made without departing from the spirit and scope of the invention as set forth in the following claims.

I claim:

1. In combination with an optical device having an adjustable focus lens having a primary axis, means for adjusting the focus of the lens, and a light for illuminating the subject being photographed including a reflector having a primary axis and a light source, the improvement comprising means mechanically coupling said reflector to the lens focus adjusting means so that the point of intersection of the primary axis of the reflector and the primary axis of the lens is varied as a function of the focus setting of the lens.

2. The combination of claim 1 wherein said reflector is pivotally mounted about an axis normal to a plane passing through the primary axes of the lens and the reflector so that said coupling means serves to vary the angular orientation of the primary axis of the reflector with respect to the axis of the lens in accordance with the focus setting of the lens.

3. The combination of claim 1 wherein said coupling means includes a link assembly operatively associated between said reflector and said lens focus adjusting means, and said lens focus adjusting means includes a manually operable member which attains a position related to the focus setting of the lens, said link assembly being coupled to said manually operable member and to said reflector for positioning thereof.

4. In combination with an optical device having an adjustable focus lens having a primary axis, means for adjusting the focus of the lens, and a light for illuminating the subject being photographed, the light including a reflector having a primary axis and a light source, said reflector being movable with respect to the lens, the improvement comprising: means coupling said light to the lens focus adjusting means so as to vary the point of intersection between the light beam from the light and the axis of the lens, said coupling means serving to vary the primary axis of the reflector with respect to the axis of the lens in accordance with the focus setting of the lens, said coupling means including a link assembly one end of which is coupled to said reflector and the remaining end of which is connected to the lens focus adjusting means.

5. The apparatus of claim 4 wherein said reflector is rotatable with respect to the lens about a fixed axis, said fixed axis being normal to a plane passing through the center of said reflector and the camera lens axis so as to facilitate adjustment of the point of intersection between the primary axis of the reflector and the axis of the lens.

6. The apparatus of claim 5 wherein the lens focusing means includes a manually operable member which attains a position related to the focus setting of the lens, said link assembly being coupled to said manually operable member and to said reflector for positioning thereof.

7. The apparatus of claim 6 wherein said link assembly includes a lug secured to said reflector and an elongated drive rod coupled to said lug and passing into the camera body, the remaining end of said drive rod being coupled to said manually operable member for movement therewith.

* * * * *